United States Patent
Zou et al.

(10) Patent No.: US 12,205,407 B2
(45) Date of Patent: Jan. 21, 2025

(54) FEW-SHOT GESTURE RECOGNITION METHOD

(71) Applicant: Shenzhen University, Shenzhen (CN)

(72) Inventors: Yongpan Zou, Shenzhen (CN); Haozhi Dong, Shenzhen (CN); Yaqing Wang, Shenzhen (CN); Kaishun Wu, Shenzhen (CN)

(73) Assignee: Shenzhen University, Shenzhen (CN)

( * ) Notice: Subject to any disclaimer, the term of this patent is extended or adjusted under 35 U.S.C. 154(b) by 336 days.

(21) Appl. No.: 17/940,266

(22) Filed: Sep. 8, 2022

(65) Prior Publication Data
US 2023/0326249 A1    Oct. 12, 2023

(30) Foreign Application Priority Data
Mar. 28, 2022 (CN) .......................... 202210309623.1

(51) Int. Cl.
*G06V 40/20* (2022.01)
*G06V 10/74* (2022.01)
*G06V 10/764* (2022.01)

(52) U.S. Cl.
CPC .............. *G06V 40/20* (2022.01); *G06V 10/74* (2022.01); *G06V 10/764* (2022.01)

(58) Field of Classification Search
CPC ....... G06V 40/20; G06V 10/74; G06V 10/764
See application file for complete search history.

(56) References Cited

U.S. PATENT DOCUMENTS

| | | | | |
|---|---|---|---|---|
| 9,430,697 | B1 * | 8/2016 | Iliadis ................. | G06V 40/172 |
| 10,078,780 | B2 * | 9/2018 | Yang ................... | G06V 10/751 |
| 10,905,383 | B2 * | 2/2021 | Barachant ............ | A61B 5/6831 |
| 11,227,151 | B2 * | 1/2022 | Luqman ................ | G06N 3/045 |
| 11,676,034 | B2 * | 6/2023 | Almazán ............... | G06V 10/82 |
| | | | | 706/20 |
| 11,783,615 | B2 * | 10/2023 | Gupta ................... | G06V 40/28 |
| | | | | 382/103 |
| 11,790,698 | B2 * | 10/2023 | Park ..................... | G06F 18/241 |
| | | | | 715/863 |
| 11,826,639 | B2 * | 11/2023 | Orion ...................... | A63F 13/24 |
| 11,887,405 | B2 * | 1/2024 | Dang ...................... | G06V 10/82 |

* cited by examiner

*Primary Examiner* — Gregory M Desire
(74) *Attorney, Agent, or Firm* — Westbridge IP LLC (57) ABSTRACT

Disclosed is a few-shot gesture recognition method. The method comprises the following steps: customizing, by a user, gesture categories, and acquiring few samples for each gesture category; inputting the acquired samples into a trained few-shot learning model, extracting a feature vector corresponding to each sample, and synthesizing feature vectors belonging to the same gesture to obtain an average feature vector corresponding to each gesture as a prototype vector; acquiring a corresponding sample for a target gesture implemented by the user, and inputting the sample into the few-shot learning model to obtain a feature vector of the target gesture as a query vector; and calculating similarities between the query vector and prototype vectors of different gestures, and selecting a gesture category corresponding to the prototype vector with the highest similarity as a prediction category of the target gesture.

9 Claims, 8 Drawing Sheets

FEW-SHOT GESTURE RECOGNITION METHOD

CROSS-REFERENCE TO RELATED APPLICATIONS

The application claims priority to Chinese Patent Application No. 202210309623.1, filed on Mar. 28, 2022, the entire contents of which are incorporated herein by reference.

TECHNICAL FIELD

The present application relates to the technical field of gesture recognition, and in particular to a few-shot gesture recognition method.

BACKGROUND

In the traditional gesture recognition technology, a gesture set is usually required to be preset when a system is constructed, and experimenters are recruited to repeatedly do each gesture for multiple times to acquire a large amount of sensor data to form a training set so as to train a recognition model (such as a deep neural network). This can result in huge labor costs for the recognition system constructer (such as an enterprise that publishes this technology). More importantly, due to the diversity of the realistic environment, the environment where training data are acquired may be greatly different from the environment where the system is actually used, for example, the environment noise is different, the device is different, the person is different, and each user wants to be able to freely define a new gesture set according to their own habits and preferences (the category and the number may be different from a preset gesture set). The problem caused thereby is that the reality requirement of diversification can't be satisfied to the model that has been trained, and the accuracy of direct use of model recognition will descend by a wide margin, that is, model generalization and expansion capability are weak.

In the prior art, the gesture recognition scheme mainly includes the following categories:

1) Extraction of characteristic quantities unrelated to environmental factors based on the underlying signal processing. For example, human body activities are physically modeled using channel state information (CSI), which is an underlying physical quantity of WiFi signals, so as to extract a characteristic quantity, i.e., a body-coordinate velocity profile (BVP), which is independent of factors such as a position, a direction and an indoor environment in which activities occur. And then, the characteristic is taken as an input of the deep network to perform human activity recognition. This approach is only applicable to behavior recognition based on multilink WiFi connection, has a narrow application range, and does not support users to freely define new gesture sets, that is, the gestures in a training set and a testing set need to keep consistent in the number and categories.

2) A domain adaptation method based on generative adversarial networks. For example, by introducing generative adversarial networks to train a feature extractor, a gesture recognizer and a domain classifier, the model can extract essential feature representations unrelated to the domain, and the cross-domain recognition capability of the model is improved. In another example, an image domain style adaptation model is used to synthesize samples of the target domain, and the network is updated based on the synthesized samples. The domain adaptation method based on generative adversarial networks needs to acquire a large amount of data in a model training stage; in addition, the complexity of the adversarial model is generally high, convergence is not easy to occur in a training process, and instantaneity is poor when the method is deployed in a commercial intelligent mobile device. Furthermore, this type of method also does not support users to freely define new gesture sets.

3) A method based on a meta-learning model. For example, the problem of cross-domain recognition is solved by means of a meta-learning method. Or target domain data are automatically generated to update the model based on a virtual gesture sample generation mechanism. At present, such methods do not support users to freely define new gesture sets, and the category and the number of gestures during model training are required to be consistent with those during actual use of users. Meanwhile, in the actual use process, the model parameters need to be finely adjusted, so that the real-time performance is poor when the mobile terminal is deployed.

SUMMARY

The present application is intended to overcome the above-mentioned defects in the prior art and provide a few-shot gesture recognition method. The method comprises the following steps:

customizing, by a user, gesture categories and acquiring a plurality of samples for each gesture category;

inputting the acquired samples into a trained few-shot learning model, extracting a feature vector corresponding to each sample, and synthesizing feature vectors belonging to the same gesture to obtain an average feature vector corresponding to each gesture as a prototype vector;

acquiring a corresponding sample for a target gesture implemented by the user and inputting the sample into the few-shot learning model to obtain a feature vector of the target gesture as a query vector; and calculating similarities between the query vector and the prototype vectors and selecting a gesture category corresponding to the prototype vector with the highest similarity as a prediction category of the target gesture;

wherein the few-shot learning model comprises a feature extraction module and a distance classifier, the prototype vector and the query vector are obtained by using the feature extraction module, and the similarity between the query vector and the prototype vector is obtained by using the distance classifier.

Compared with the prior art, the few-shot gesture recognition method has the advantages that the existing open-source dataset can be used for model training, so that the labor cost for acquiring the training dataset is reduced, and the trained model can be rapidly updated by means of a small number of samples to adapt to the use environment. In addition, the requirement of users for freely defining new gestures can be satisfied, and therefore the generalization and the expansion capability of the model are improved.

Other features of the present application and advantages thereof will become apparent from the following detailed description of exemplary embodiments of the present application with reference to the accompanying drawings.

BRIEF DESCRIPTION OF THE DRAWINGS

The accompanying drawings, which are incorporated in and constitute a part of this specification, illustrate the embodiments of the present application and together with the description, serve to explain the principles of the present application.

In the figures, Conv represents convolutional layer; Block represents residual block; Avg-pool represents average pooling; FC layer represents fully-connected layer; Set encoder represents set encoder; Para-generator represents parameter generator; NN Classifier represents NN classifier; MLP represents multilayer perceptron; CNN represents convolutional neural network.

DETAILED DESCRIPTION OF THE EMBODIMENTS

Various exemplary embodiments of the present application will now be described in detail with reference to the accompanying drawings. It should be noted that: the relative arrangement of the components and steps, the numerical expressions and numerical values set forth in these embodiments do not limit the scope of the present application unless it is specifically stated otherwise.

The following description of at least one exemplary embodiment is merely illustrative in nature and is in no way intended to limit the present application, application thereof or use thereof.

Techniques, methods, and devices known to those of ordinary skills in the relevant art may not be discussed in detail, but the techniques, methods, and devices should be considered as a part of the specification where appropriate.

In all examples shown and discussed herein, any specific value should be construed as exemplary only rather than limiting. Thus, other examples of the exemplary embodiments may have different values.

It should be noted that: like reference numbers and letters refer to like items in the following figures, and thus, once an item is defined in one figure, it does not need to be further discussed in subsequent figures.

Figure 1:
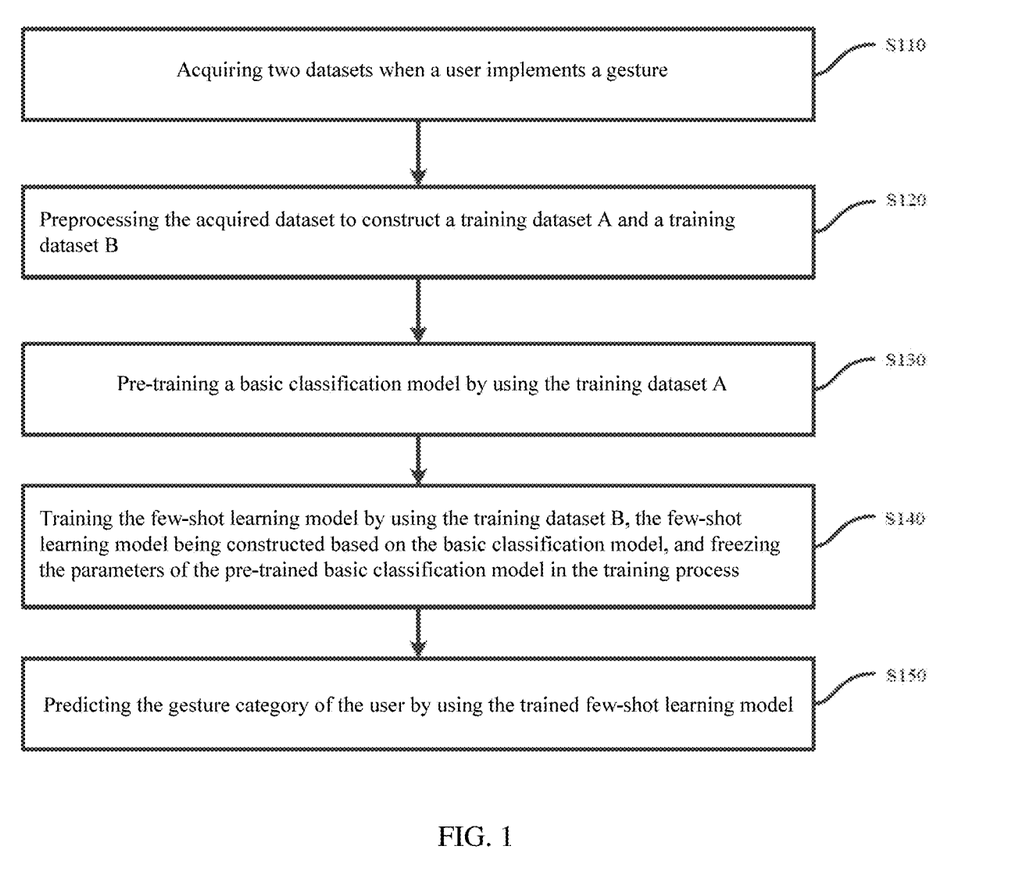
FIG. 1 is a flowchart of a few-shot based gesture recognition method according to one embodiment of the present application.
Figure 2:
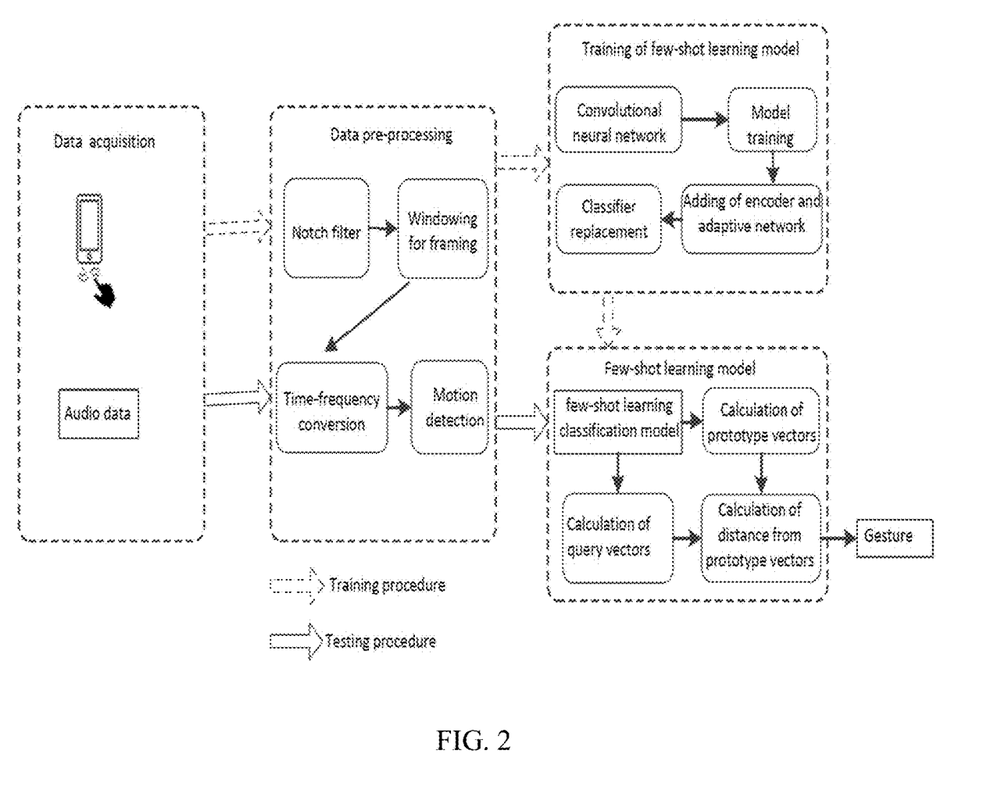
FIG. 2 is an overall block diagram of a few-shot gesture recognition method according to one embodiment of the present application.

Referring to FIGS. 1 and 2, the few-shot gesture recognition method provided herein comprises the following steps:

Step S110, acquiring two datasets when a user implements a gesture.

In the following, the present application is described by taking the example of acquiring sound wave samples by using an intelligent device which may be various types of devices such as smartphones, smart watches and smart speakers.

Figure 7:
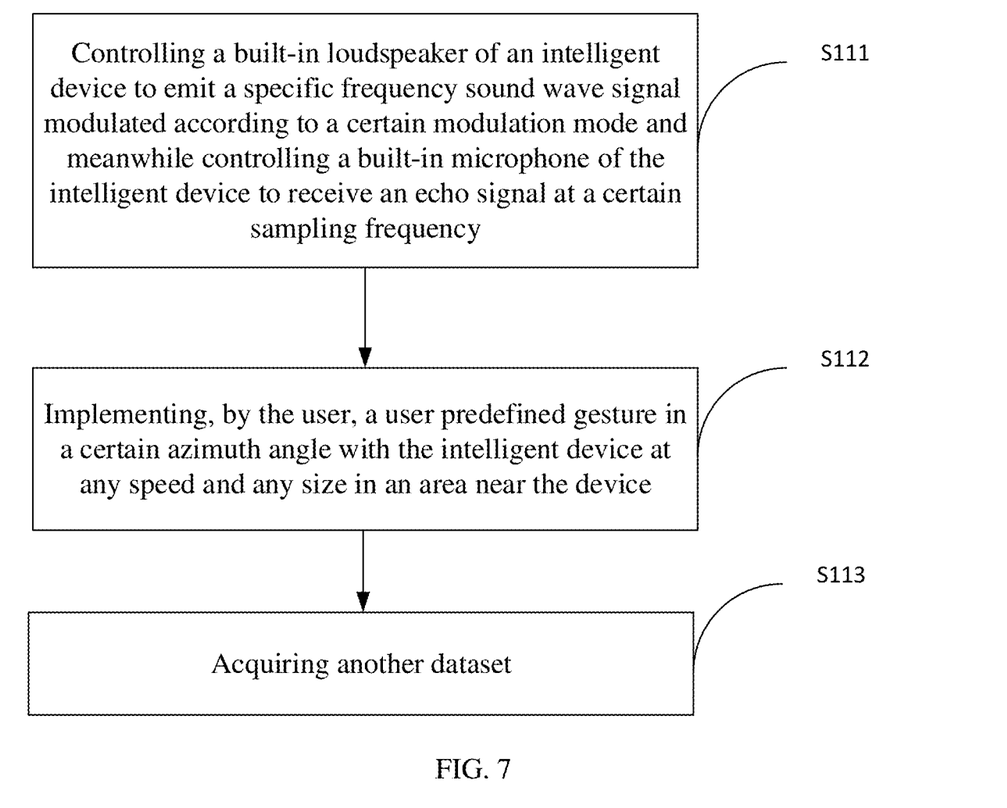
FIG. 7 is a flowchart of a dataset acquisition process according to one embodiment of the present application.

Specifically, as shown in FIG. 7, the dataset acquisition process comprises the following steps:

Step S111, controlling a built-in loudspeaker of an intelligent device to emit a specific frequency sound wave signal modulated according to a certain modulation mode and meanwhile controlling a built-in microphone of the intelligent device to receive an echo signal at a certain sampling frequency.

For example, the emission frequency is set beyond the human hearing range and within the frequency response range of commercial device hardware, and may be set to be between 19 KHz and 22 KHz, and the sampling frequency satisfies the Nyquist sampling law and may be set to be 44.1 KHz or 48 KHz.

Step S112, implementing, by the user, a user predefined gesture in a certain azimuth angle with the intelligent device at any speed and any size in an area near the device.

For example, the azimuth angle between the gesture and the intelligent device is 0 degrees or other degrees of angle. The gesture may be a general gesture or a gesture with a certain meaning, such as writing Arabic numbers or English letters.

By implementing the gesture and acquiring the sound wave signals as described above, a dataset may be obtained, that is, the dataset comprises one or more sound wave sequence signals corresponding to the implemented gestures.

Step S113, acquiring another dataset.

Similarly, another dataset may be acquired, differing from the first dataset in that the azimuth angle formed with the device when the user implements the gesture is another angle, such as 90 degrees.

Step S120, preprocessing the acquired dataset to construct a training dataset A and a training dataset B.

In the step S120, the process of preprocessing the two acquired datasets comprises: filtering, windowing, short-time Fourier transform, motion detection, time-frequency spectrogram resizing and the like.

First, the dataset is filtered. The filtering can be performed with a 3-order Butterworth notch filter with a stop-band range of [18985, 19015] Hz with the objective of removing the center frequency of 19 KHz. If the frequency of sound wave emitted by a loudspeaker is other than 19 KHz, parameters of the notch filter are adjusted accordingly.

Subsequently, the sound wave signal sequence is subjected to sliding windowing for framing, and a fast Fourier transform is performed for each frame. The class of sliding windows may be a Hanning window with a width of 8192 sample points (corresponding to 0.1858 seconds at a sampling rate of 44.1 KHz) and a step value of 1024 sample points. Through the above operation, a one-dimensional sound signal sequence can be converted into a two-dimensional time-frequency spectrogram.

Then, if the user makes a plurality of gestures in succession, each gesture is required to be detected automatically to extract a time-frequency spectrogram corresponding to each gesture.

In one embodiment, the action detection process comprises: for each frame in the time-frequency spectrogram, scanning each frequency bin from bottom to up (from a low frequency to a high frequency), and when it is found that there are more than 4 consecutive frequency bins with an energy higher than −80 dB, the frame is determined as an active frame and retained. By using this method, the frames corresponding gesture starting and gesture ending can be found, and a complete time-frequency spectrogram corresponding to the gesture can be further extracted.

Finally, considering that the gesture duration is not constant, the extracted time-frequency spectrogram needs to be adjusted to a uniform size (such as 224×224) as an input of a subsequent model.

Figure 3A:
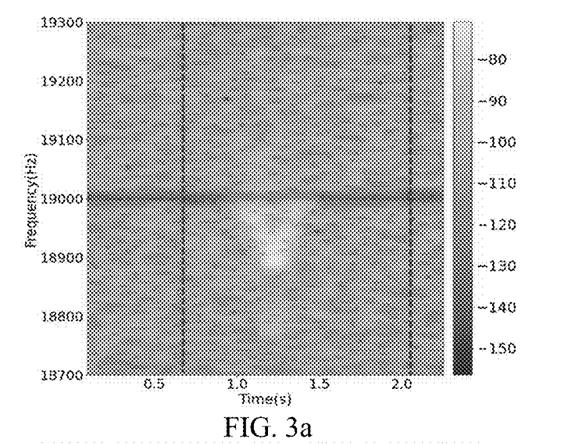
FIGS. 3a-3d are time-frequency spectrograms corresponding to different gestures according to one embodiment of the present application.
Figure 3B:
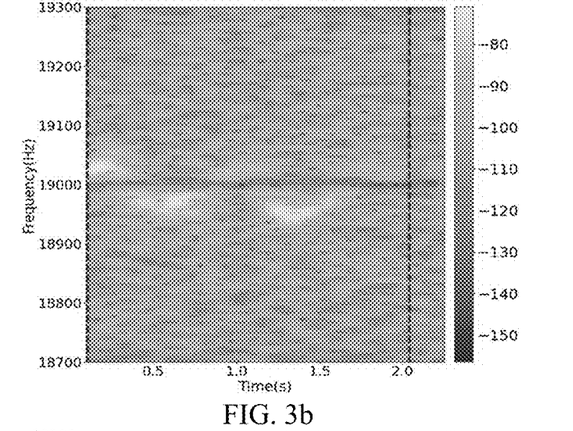
Figure 3C:
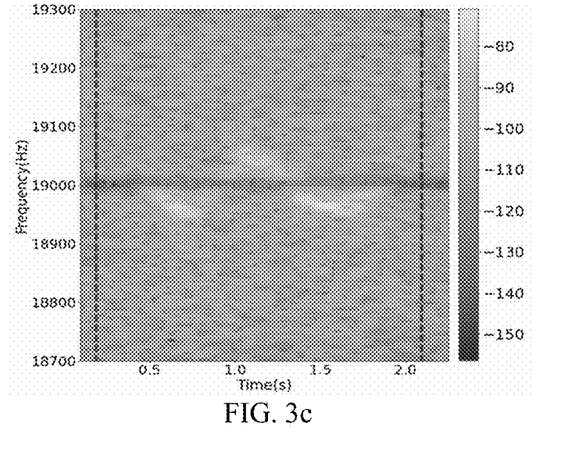
Figure 3D:
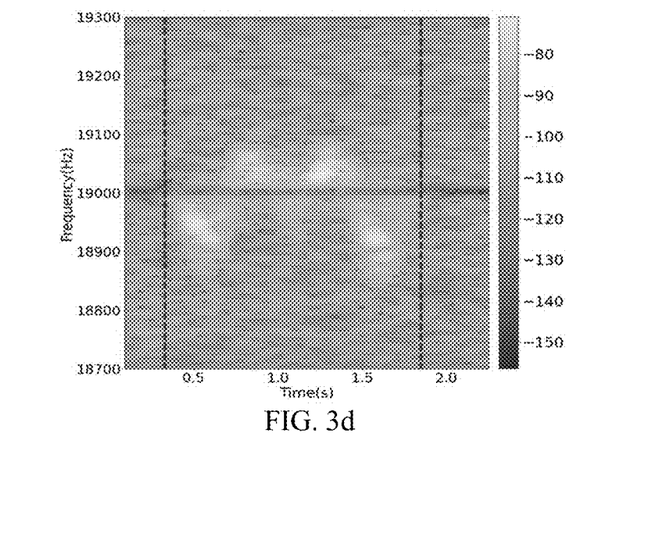

FIGS. 3a-3d are schematic time-frequency spectrograms of different types of gestures, wherein two vertical dotted lines represent a gesture starting moment and a gesture ending moment, respectively, and the time-frequency spectrogram between the two vertical dotted lines corresponds to one gesture. Gesture types include numeric types (e.g., 0-9) and alphabetic types, such as 26 letters. FIG. 3a corresponds to the numeral 1, FIG. 3b corresponds to the numeral 3, FIG. 3c corresponds to the letter D, and FIG. 3d corresponds to the letter H.

Through the above process, two training datasets corresponding to the two datasets can be obtained, and are labeled as the training dataset A and the training dataset B for convenience of description.

Step S130, pre-training a basic classification model by using the training dataset A.

Figure 4:
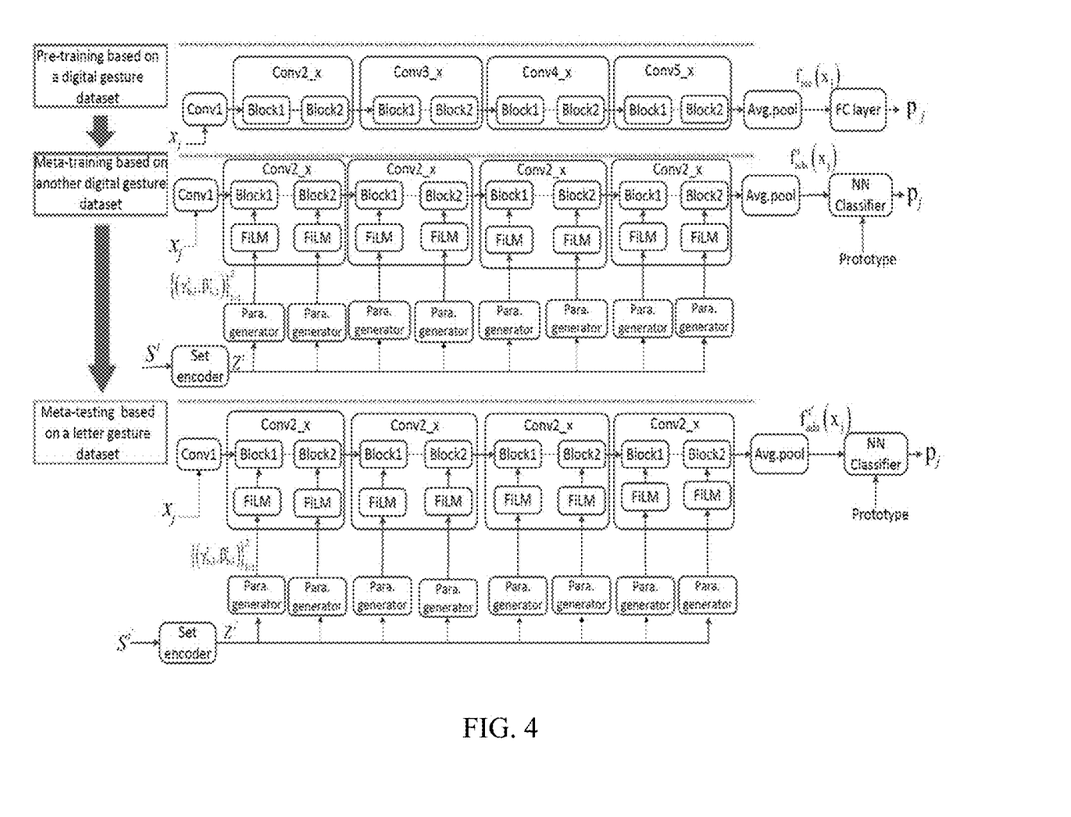
FIG. 4 is a schematic diagram of an example of a few-shot learning model according to one embodiment of the present application.

A basic classification model is trained by using the training dataset A. The basic classification model may be a common convolutional neural network and integrally comprises a feature extraction part and a multilayer perceptron classifier. As shown in FIG. 4, the basic classification model may be a residual network comprising a plurality of residual blocks, each of which may contain two convolutional layers. The process of training the basic classification model is referred to as pre-training.

The basic classification model may be various types of deep learning models, for example, residual networks with different layers, such as ResNet10 and ResNet18, and may also be other types of networks, such as CNN5 and ShuffleNet.

Through pre-training, initial parameters of the basic classification model can be obtained, and a feature extractor with strong feature extraction capability is obtained, wherein the feature extractor refers to the remaining part of the basic classification model after a fully-connected layer is removed.

Step S140, training the few-shot learning model by using the training dataset B, the few-shot learning model being constructed based on the basic classification model, and freezing the parameters of the pre-trained basic classification model in the training process.

Still referring to FIG. 4, compared with the basic classification model, an encoder, a conversion layer (FILM) and an adaptive network (or called a parameter generator, labeled as Para. generator) are further added to the few-shot learning model, that is, in the few-shot learning model, a feature extractor in the basic classification model is modified.

In FIG. 4, $x_j$ represents an input sample in the form of a vector; $S^t = \{(x_i, y_i)\}_{i=1}^{N \cdot K}$ represents a support sample set, wherein the number of the support sample set is the product of the number N of the gesture categories to be classified and the number K of the support samples provided by each gesture, and $y_i$ represents a corresponding gesture category. $z^t$ represents an output of the encoder. $f_{pre}(x_j)$ represents a feature vector corresponding to the input sample $x_j$ extracted by the feature extractor in the basic classification model, or is referred to as sample characterizations. $\{(\gamma_{b,l}^t, \beta_{b,l}^t)\}_{l=1}^{2}$ is an output of the parameter generator and further input into two sets of parameter pairs of two FiLM layers (therefore l=1,2) which are $(\gamma_{b,1}^t, \beta_{b,1}^t)$ and $(\gamma_{b,2}^t, \beta_{b,2}^t)$, respectively. The parameter pairs output by the FILM layers are used for stretching and translating feature vectors of a middle layer of the feature extractor, wherein $\gamma_{b,l}^t$ represents a stretching factor and $\beta_{b,l}^t$ represents a translation factor. $f_{ada}^t(\cdot)$ represents the feature extractor in the few-shot learning model, and accordingly, $f_{ada}^t(x_j)$ and $f_{ada}^h(x_j)$ represent feature vectors corresponding to the input sample $x_j$ extracted by the feature extractor in the few-shot learning model, respectively. In this patent, i, j, t, b, l and t', etc. are all references.

Figure 8:
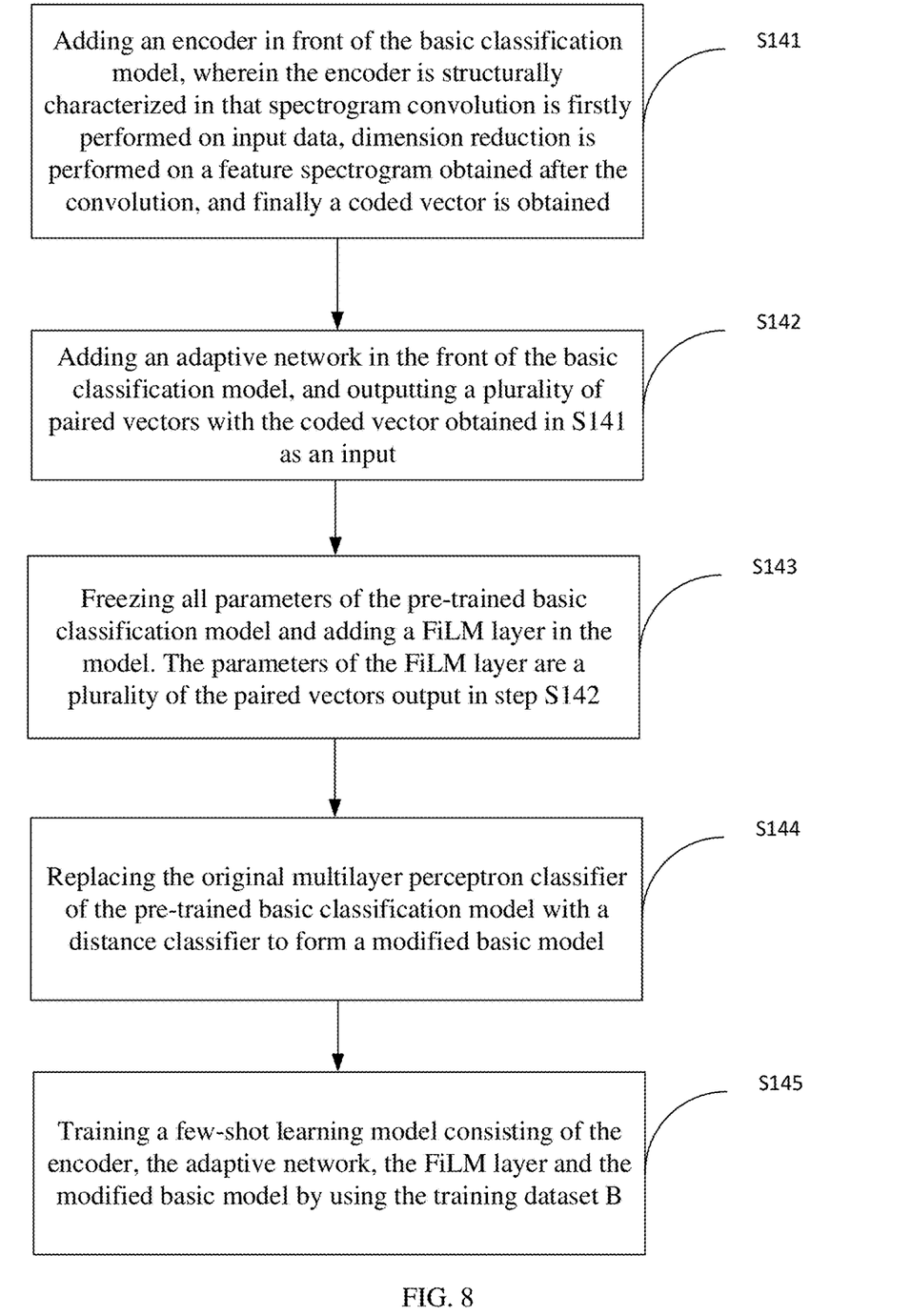
FIG. 8 is a flowchart of a process of constructing and training the few-shot learning model according to one embodiment of the present application.

In one embodiment, as shown in FIG. 8, the process of constructing and training the few-shot learning model comprises the following steps:

Step S141, adding an encoder in front of the basic classification model, wherein the encoder is structurally characterized in that spectrogram convolution is firstly performed on input data, dimension reduction is performed on a feature spectrogram obtained after the convolution, and finally a coded vector is obtained.

Figure 5:
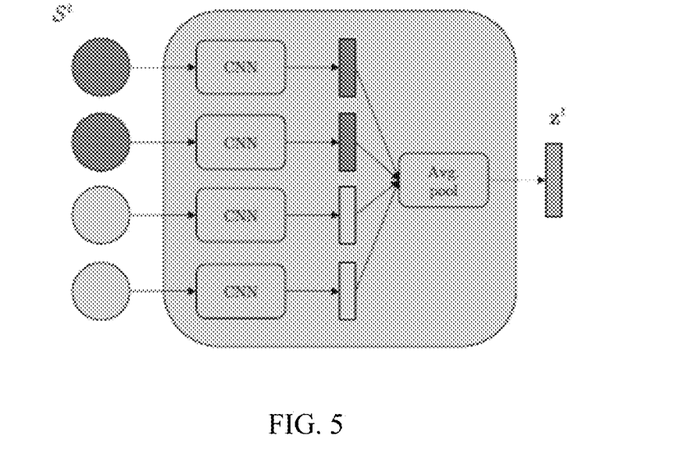
FIG. 5 is a schematic diagram of an encoder structure according to one embodiment of the present application.

The structure of the encoder is shown in FIG. 5, which comprises a plurality of convolutional neural networks for extracting feature vectors corresponding to input samples, respectively, performing global pooling on each feature vector, and outputting a single coded characterization vector $z^t$.

Step S142, adding an adaptive network in the front of the basic classification model, and outputting a plurality of paired vectors with the coded vector obtained in S141 as an input.

Figure 6:
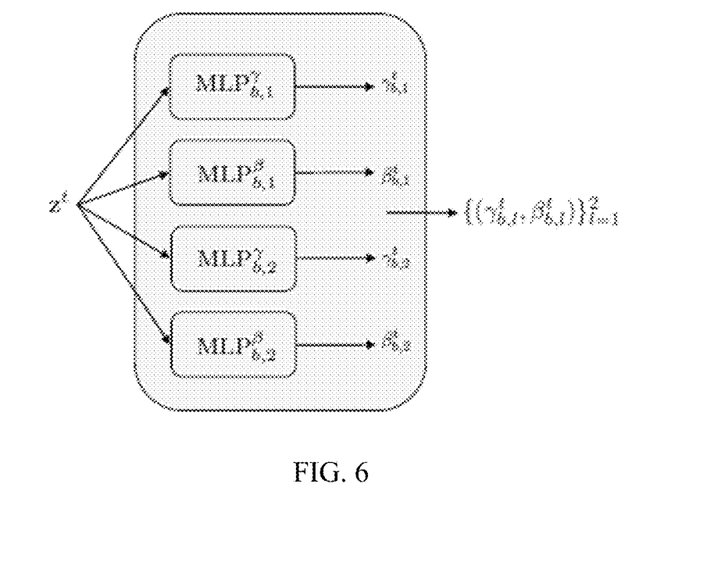
FIG. 6 is a schematic diagram of an adaptive network structure according to one embodiment of the present application.

The structure of the adaptive network is shown in FIG. 6, and the output paired vectors refer to $\{(\gamma_{b,l}^t, \beta_{b,l}^t)\}_{l=1}^{2}$, wherein one parameter vector $\gamma_{b,l}^t$ represents a stretching factor and $\beta_{b,l}^t$ represents a translation factor. The stretching factor and the translation factor are used in combination to perform linear transformation, i.e., stretching and translation, on the feature vectors in the middle layer of the few-shot learning model.

Step S143, freezing all parameters of the pre-trained basic classification model and adding a FiLM layer in the model. The parameters of the FILM layer are a plurality of the paired vectors output in step S142.

The FILM layer is used for performing linear transformation on the result of the convolutional layer in the original basic classification model. As shown in FIG. 4, the FILM layer acts on two convolutional layers in each residual block, that is, for two sets of parameter pairs $\{(\gamma_{b,l}^t, \beta_{b,l}^t)\}_{l=1}^{2}$ output by the adaptive network, each set of parameter pair is used as an input of the FILM layer, and linear transformation (or affine transformation) is performed on the input and the output of each convolutional layer of the residual block in the FiLM layer, that is, a new characteristic quantity obtained by multiplying a vector output by the convolutional layer by a stretching factor $\gamma_{b,l}^t$ and then adding $\beta_{b,l}^t$ is taken as an input of a next layer in the residual block.

Step S144, replacing the original multilayer perceptron classifier of the pre-trained basic classification model with a distance classifier to form a modified basic model.

The distance classifier may be various types such as an L1 distance classifier or a Euclidean distance classifier (L2 distance classifier). The following description takes an L1 distance classifier as an example.

Step S145, training a few-shot learning model consisting of the encoder, the adaptive network, the FiLM layer and the modified basic model by using the training dataset B.

The parameters of the modified basic model are determined in a pre-training link, and are frozen and not updated in the training link.

When a few-shot learning model is trained, a small number of samples of partial categories are randomly selected from the training dataset B by using the training method of few-shot learning, and different data of the same category are randomly selected to be combined into a task. An average value of feature vectors obtained after the small number of samples pass through the few-shot learning model is taken as a prototype vector, a feature vector obtained after other data pass through the few-shot learning model is taken as a query vector, a prediction result is obtained after the prototype vector and the query vector pass through an L1 distance classifier, and a training loss is calculated with a real label of the query vector so as to update the parameters of the model. This training process is referred to as meta-training.

It should be understood that the parameters of the basic classification model remain unchanged (frozen) in the meta-training link. The meta-training link is mainly used for obtaining parameters of the encoder and the adaptive network. Because the training datasets used in the pre-training and meta-training links are different, the combination of these two links allows the model to learn automatically how to adapt to different datasets. Compared with the method that the training process of a basic classification model is removed and the modified feature extractor and the distance classifier are directly trained, the method disclosed herein has the advantages that the encoder, the adaptive network and the FiLM layer are added, so that the model can automatically adjust the features extracted by the feature extractor according to the input samples (affine transformation is performed on feature vectors), new sample input is further adapted, and the migration capability of the model is enhanced.

In addition, by replacing the original multilayer perceptron classifier with a distance classifier, the following problems are solved: the multilayer perceptron classifier itself comprises parameters which need to be finely adjusted by customized gesture samples in a testing link, and in order to achieve a good effect, the amount of samples for finely adjusting the classifier needs to be large, so that the burden of a user is increased and the prediction efficiency is reduced; the use of the multilayer perceptron classifier requires that the number of the gesture categories in the actually-used links must be kept consistent with the number of the gesture categories in the training stage, that is, a user cannot customize new gestures of any category.

Step S150, predicting the gesture category of the user by using the trained few-shot learning model.

Figure 9:
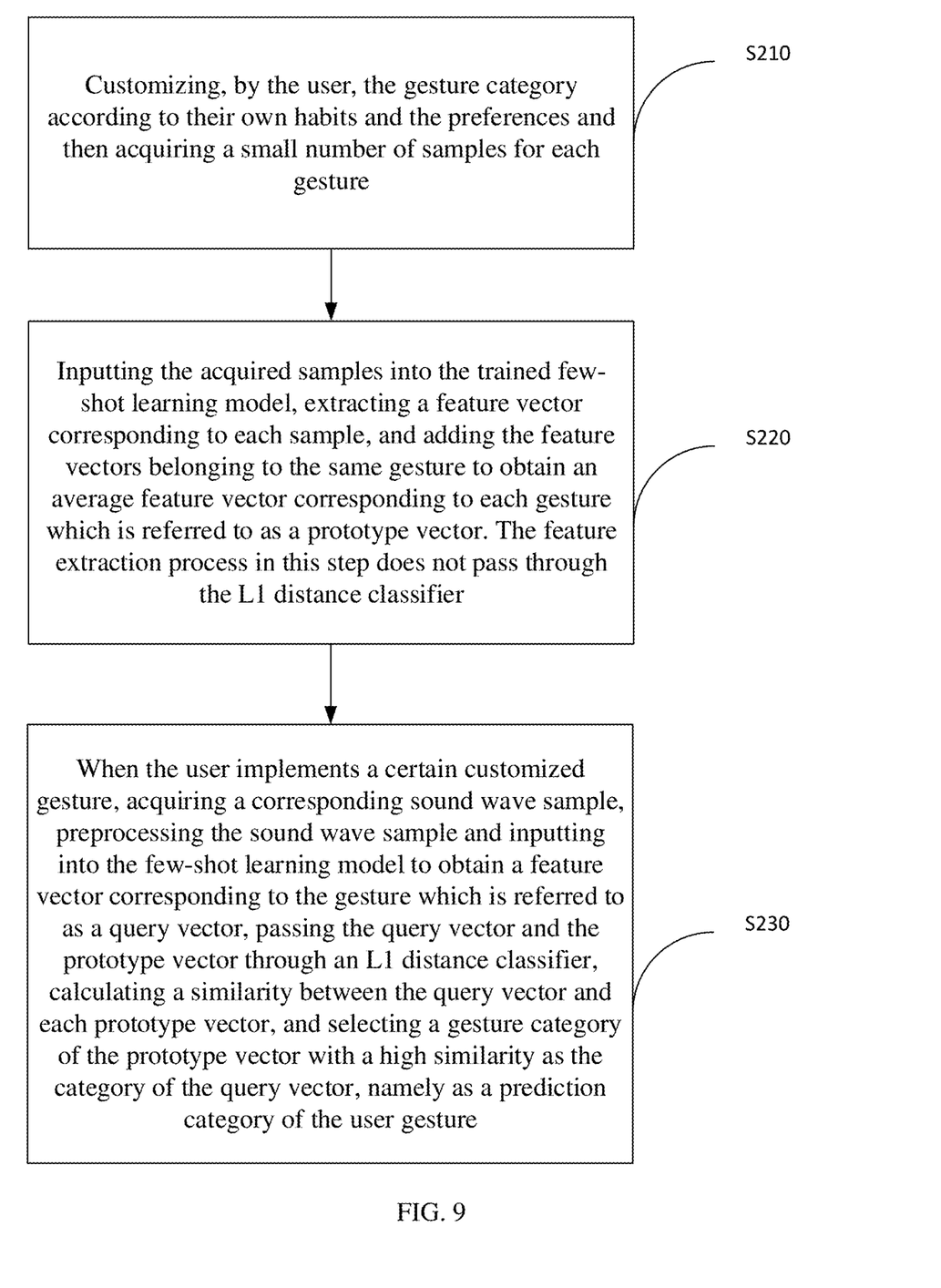
FIG. 9 is a flowchart of a method used for a test process or an actual use link according to one embodiment of the present application.

After the parameters of the whole few-shot learning model are determined, that is, after the few-shot learning model is trained, the method can be used for a test process or an actual use link, and as shown in FIG. 9, specifically comprises the following steps:

Step S210, firstly customizing, by the user, the gesture category according to their own habits and the preferences and then acquiring a small number of samples for each gesture.

For example, no more than 3 samples may correspond to each gesture category.

Step S220, inputting the acquired samples into the trained few-shot learning model, extracting a feature vector corresponding to each sample, and adding the feature vectors belonging to the same gesture to obtain an average feature vector corresponding to each gesture which is referred to as a prototype vector. The feature extraction process in this step does not pass through the L1 distance classifier.

Step S230, when the user implements a certain customized gesture, acquiring a corresponding sound wave sample, preprocessing the sound wave sample and inputting into the few-shot learning model to obtain a feature vector corresponding to the gesture which is referred to as a query vector, passing the query vector and the prototype vector through an L1 distance classifier, calculating a similarity between the query vector and each prototype vector, and selecting a gesture category of the prototype vector with a high similarity as the category of the query vector, namely as a prediction category of the user gesture.

To further verify the effect of the present application, experiments are performed. The result shows that when a user only provides 1, 2 or 3 samples for each gesture category, the recognition accuracy of the proposed method for 26 user-customized new gestures is 69.4%, 79.0% and 82.4%, respectively. The result is much higher than that of the existing methods (e.g., "Towards domain-independent complex and fine-grained gesture recognition with rfid. Proceedings of ACM CHI", 4(ISS): 1-22, 2020; C. Dian, D. Wang, Q. Zhang, R. Zhao, and Y. Yu.).

It should be noted that those skilled in the art can appropriately change or modify the above-mentioned embodiments without departing from the spirit and scope of the present application. For example, open-source related datasets may be used as the datasets for pre-training and meta-training. For the data preprocessing stage, the notch filter can be replaced with a band-stop filter; the type of a window function in the windowing for framing can be properly selected, and the parameters of the window function can be adjusted; the method for converting a one-dimensional time sequence signal into a two-dimensional time-frequency spectrogram can be a Fourier transform, a wavelet transform or a Hilbert-Huang transform. In addition, the detection of the gesture motion can utilize Doppler frequency shift, because relative motion is generated between the intelligent device and the gesture when the gesture is implemented, and whether the gesture motion exists can be determined according to the change amplitude of the frequency shift. In addition, besides the gesture recognition using sound waves as a sensing medium, it can also be applied to gesture recognition using other sensor data, such as WiFi signals and inertial measurement units, as a sensing medium.

In summary, compared with the prior art, the present application has at least the following technical effects:

1) The present application can support users to freely define any category and any number of gestures, and does not require users to interact only according to the preset gesture category when using the system, thus significantly improving the expandability and the user experience.

2) According to the present application, users only need to provide a customized few number of samples when using the system, so that the model can achieve high recognition accuracy in a new environment, for example, the number of each gesture is no more than 3, and the total number of samples is 3N, wherein N is the number of categories of user-customized gestures.

3) According to the present application, the model does not need to be finely adjusted in the using link, thereby ensuring high instantaneity.

4) According to the present application, the open-source dataset is allowed to use in the model pre-training or meta-training stage to fully utilize the existing dataset without recruiting personnel for acquisition, thereby reducing the cost of the model training stage.

The present application may be a system, a method and/or a computer program product. The computer program product may include a computer-readable storage medium having computer-readable program instructions loaded thereon for causing a processor to implement various aspects of the present application.

The computer-readable storage medium may be a tangible device that holds and stores the instructions for use by an instruction execution device. The computer-readable storage medium may include, but is not limited to, for example, an electronic storage device, a magnetic storage device, an optical storage device, an electromagnetic storage device, a semiconductor storage device, or any suitable combination of the foregoing. More specific examples (non-exhaustive list) of the computer-readable storage medium include: a portable computer disk, a hard disk drive, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical coding device such as punch card or in-groove raised structure having instructions stored thereon, and any suitable combination of the foregoing. The computer-readable storage medium as used herein is not to be interpreted as a transitory signal per se, such as a radio wave or other freely propagating electromagnetic wave, an electromagnetic wave propagating through a waveguide or other transmission medium (e.g., optical pulses through a fiber optic cable), or an electrical signal transmitted through an electrical wire.

The computer-readable program instructions described herein may be downloaded from a computer-readable storage medium to computing/processing devices, or to an external computer or external storage device via a network, such as the Internet, a local area network, a wide area network and/or a wireless network. The network may include copper transmission cables, fiber optic transmission, wireless transmission, routers, firewalls, switches, gateway computers and/or edge servers. The network adapter card or network interface in each computing/processing device receives a computer-readable program instruction from the network and forwards the computer-readable program instruction for storage in a computer-readable storage medium in each computing/processing device.

Computer program instructions for executing operations of the present application may be assembler instructions, instruction set architecture (ISA) instructions, machine instructions, machine-related instructions, microcode, firmware instructions, state setting data, or source or object code in any combination of one or more programming languages including an object-oriented programming language such as Smalltalk, C++ and Python, and a conventional procedural programming language such as the "C" language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, aspects of the present application are implemented by personalizing an electronic circuit, such as a programmable logic circuit, a field programmable gate array (FPGA) or a programmable logic array (PLA), with state information of computer-readable program instructions, the electronic circuit being capable of executing the computer-readable program instructions.

Aspects of the present application are described herein with reference to a flowchart and/or block diagrams of methods, apparatus (systems) and computer program products according to embodiments of the present application. It should be understood that each block of the flowchart and/or block diagrams, and combinations of blocks in the flowchart and/or block diagrams, can be implemented by computer-readable program instructions.

These computer-readable program instructions may be provided to a processor of a general-purpose computer, special-purpose computer or other programmable data processing apparatus to produce a machine, such that these instructions, when being executed via the processor of the computer or other programmable data processing apparatus, create an apparatus for implementing the functions/motions specified in one or more blocks in the flowchart and/or block diagrams. These computer readable program instructions may also be stored in a computer readable storage medium, wherein these instructions can direct a computer, a programmable data processing apparatus and/or other devices to function in a particular manner, such that the computer readable medium storing the instructions comprises an article of manufacture including instructions which implement the functions/motions specified in the one or more blocks of the flowchart and/or block diagrams.

The computer-readable program instructions may also be loaded onto a computer, other programmable data processing apparatus or other devices to cause a series of operational steps to be executed on the computer, other programmable apparatus or other devices to produce a computer implemented process such that the instructions executed on the computer, other programmable apparatus or other devices implement the functions/motions specified in the one or more blocks of the flowchart and/or block diagrams.

The flowchart and block diagrams in the figures illustrate the architecture, functions, and operation of possible implementations of the system, method and computer program product according to various embodiments of the present application. In this regard, each block in the flowchart or block diagrams may represent a portion of a module, segment or instructions which comprises one or more executable instructions for implementing the specified logical functions. In some alternative implementations, the functions noted in the blocks may occur out of the order noted in the figures. For example, two blocks shown in succession may, in fact, be executed substantially concurrently, or the blocks may sometimes be executed in the reverse order, depending upon the functions involved. It should also be noted that each block in the block diagrams and/or the flowchart, and combinations of blocks in the block diagrams and/or the flowchart, can be implemented by special-purpose hardware-based systems that perform the specified functions or motions, or by combinations of special-purpose hardware and computer instructions. It is well known to those skilled in the art that the implementations by hardware and software and a combination of software and hardware are equivalent.

While various embodiments of the present application have been described above, the descriptions are exemplary, not exhaustive, and not limited to the disclosed embodiments. Many modifications and variations will be apparent to those of ordinary skill in the art without departing from the scope and spirit of the described embodiments. The terms used herein are chosen in order to best explain the principles of the embodiments, the practical application or technical improvements in the market, or to enable others of ordinary skill in the art to understand the embodiments disclosed herein. The scope of the present application is defined by the appended claims.

The invention claimed is:

1. A few-shot gesture recognition method, comprising the following steps:
    customizing, by a user, gesture categories and acquiring a plurality of samples for each gesture category;
    inputting the acquired samples into a trained few-shot learning model, extracting a feature vector corresponding to each sample, and synthesizing feature vectors belonging to the same gesture to obtain an average feature vector corresponding to each gesture as a prototype vector;
    acquiring a corresponding sample for a target gesture implemented by the user and inputting the sample into the few-shot learning model to obtain a feature vector of the target gesture as a query vector; and
    calculating the similarities between the query vector and prototype vectors of different gestures and selecting a gesture category corresponding to the prototype vector with the highest similarity as a prediction category of the target gesture;
    wherein the few-shot learning model comprises a feature extractor and a distance classifier, the prototype vector and the query vector are obtained by using the feature extractor, and the similarity between the query vector and the prototype vector is obtained by calculation using the distance classifier;
    wherein the few-shot learning model is trained according to the following steps:
    pre-training a basic classification model by using a first training dataset, wherein the first training dataset reflects a corresponding relation between the samples acquired when the user implements the gestures and the gesture categories, and the basic classification model comprises a first feature extraction module and a multilayer perceptron classifier; and
    training the few-shot learning model by using a second training dataset and freezing the pre-trained basic classification model in the training process;
    wherein the few-shot learning model is constructed according to the following steps:
    adding an encoder, an adaptive network and a conversion layer on a pre-trained basic classification model, wherein the encoder is used for coding input data to obtain a coded vector; the self-adaptive network takes the coded vector as an input and outputs a parameter vector representing linear transformation; the conversion layer performs linear transformation on a convolutional layer result in the basic classification model based on the parameter vector; and
    replacing the multilayer perceptron classifier of the basic classification model with the distance classifier to construct the few-shot learning model.

2. The method according to claim 1, wherein in the process of training the few-shot learning model, a small number of samples of partial categories are randomly selected from the second training dataset, and different data of the same category are randomly selected to be combined into a task; an average value of feature vectors obtained after the small number of samples pass through the few-shot learning model is taken as a prototype vector, a feature vector obtained after other data pass through the few-shot learning model is taken as a query vector, a category prediction result is further obtained after the prototype vector and the query vector pass through the distance classifier, and a training loss is calculated with a real label of the query vector.

3. The method according to claim 1, wherein the distance classifier is an L1 distance classifier or an L2 distance classifier.

4. The method according to claim 1, wherein the first training dataset and the second training dataset are obtained according to the following steps:
    controlling a built-in loudspeaker of an intelligent device to emit a specific frequency sound wave signal modulated according to a certain modulation mode and controlling a built-in microphone of the intelligent device to receive an echo signal at a certain sampling frequency;
    implementing, by the user, a user predefined gesture in a first azimuth angle with the intelligent device at any speed and any size in an area near the intelligent device, and acquiring a first dataset;
    implementing, by the user, a gesture in a second azimuth angle formed with the intelligent device, and acquiring a second dataset, wherein the first azimuth angle is different from the second azimuth angle, and the first dataset and the second dataset each comprise a plurality of acquired one-dimensional sound signal samples; and
    preprocessing the first dataset and the second dataset to convert a one-dimensional sound signal sequence into a two-dimensional time-frequency spectrogram, and further constructing into the first training dataset and the second training dataset, wherein the first training dataset and the second training dataset reflect a corresponding relation between the two-dimensional time-frequency spectrograms and the gesture categories, and the two-dimensional time-frequency spectrograms reflects time-frequency characteristics between a gesture starting frame and a gesture ending frame.

5. The method according to claim 4, wherein in case of a user implementing a plurality of gestures in succession, each gesture is detected to extract a two-dimensional time-frequency spectrogram corresponding to each gesture according to the following steps:
    scanning each frequency bin from a low frequency to a high frequency for each frame in the time-frequency spectrogram, determining the frame as an active frame when an energy of the consecutive frequency bins more than a set threshold is higher than a set energy threshold, and further finding the gesture starting frame and the gesture ending frame to extract two-dimensional time-frequency spectrograms corresponding to different gestures.

6. The method according to claim 1, wherein the encoder is used for performing spectrogram convolution on the input data, then performing dimension reduction on a feature map obtained after the convolution, and further obtaining the coded vector.

7. The method according to claim 1, wherein the basic classification model comprises a plurality of residual blocks, each residual block comprises a plurality of convolutional layers, the coded vector output by the encoder is transmitted to the adaptive network, and the parameter vector output by the adaptive network comprises a stretching factor and a translation factor and is provided to the conversion layer.

8. A non-transitory computer-readable storage medium having a computer program stored thereon, wherein when the computer program is executed by a processor, the steps of the method according to claim 1 are implemented.

9. A computer device, comprising a memory and a processor, wherein a computer program capable of operating on the processor is stored on the memory, and when the processor executes the computer program, the steps of the method according to claim 1 are implemented.

\* \* \* \* \*